United States Patent [19]

Truchet

[11] Patent Number: 4,826,230
[45] Date of Patent: May 2, 1989

[54] TOOL-GRIPPING DEVICE FOR REMOTE MANIPULATORS, ROBOTS OR LIKE ASSEMBLIES

[75] Inventor: Gaston Truchet, Faverges, France

[73] Assignee: S.A. Des Etablissements Staubli, Faverges, France

[21] Appl. No.: 125,587

[22] Filed: Nov. 25, 1987

[30] Foreign Application Priority Data

Dec. 16, 1986 [FR] France ............................... 86 17776

[51] Int. Cl.$^4$ ............................................... B66C 1/66
[52] U.S. Cl. ........................................ 294/88; 294/90; 901/29; 901/41; 279/156; 279/29; 279/79
[58] Field of Search ............... 294/82.26, 82.35, 86.15, 294/86.33, 86.4, 88, 90, 92, 102.1; 403/322, 324; 901/28, 29, 30, 41; 279/1 TE, 1 SG, 19.6, 24, 29, 79, 89

[56] References Cited

U.S. PATENT DOCUMENTS

| 1,618,851 | 2/1927 | Thunberg et al. | 279/79 X |
| 2,089,166 | 8/1937 | Reichardt | 279/79 X |
| 2,580,930 | 1/1952 | Kost | 279/79 UX |
| 3,498,624 | 9/1967 | Hammond et al. | 279/89 X |
| 3,795,420 | 3/1974 | Preston | 294/90 |
| 3,845,963 | 11/1974 | Price | 279/89 |
| 4,585,369 | 4/1986 | Manesse et al. | 294/90 X |
| 4,610,075 | 9/1986 | Eriksson . | |
| 4,676,142 | 6/1987 | McCormick et al. | 901/30 X |
| 4,710,077 | 12/1987 | Ramunas | 279/79 X |

FOREIGN PATENT DOCUMENTS

| 1487324 | 7/1967 | France . | |
| 2227211 | 12/1974 | France | 294/90 |
| 2581338 | 7/1986 | France . | |
| 163737 | 8/1963 | U.S.S.R. | 294/90 |

Primary Examiner—Johnny D. Cherry
Assistant Examiner—Gary C. Hoge
Attorney, Agent, or Firm—Dowell & Dowell

[57] ABSTRACT

A tool-gripping device for remote manipulators, industrial robots and like assemblies which includes a sleeve provided with a movable locking element having an opening therethrough which is traversed by a stepped pin member associated with each tool and wherein the locking element is resiliently urged and operable to engage the pin member at an angle with respect to the longitudinal axis thereof to thereby force the tool into close proximity with the gripping device.

2 Claims, 5 Drawing Sheets

TOOL-GRIPPING DEVICE FOR REMOTE MANIPULATORS, ROBOTS OR LIKE ASSEMBLIES

BACKGROUND OF THE INVENTION

Field of the Invention

The present invention relates to gripping devices mounted at the end of the mobile member of remote manipulators, industrial robots or other machining centres, for the purpose of gripping a work tool prior to operating it or of releasing this tool at the end of work, these operations being carried out entirely automatically, without manual intervention.

SUMMARY OF THE INVENTION

It is a particular purpose of the invention to produce a gripping device of the type set forth hereinabove, which is of simple and reliable construction, while being able to avoid any appearance of clearance between the device and each of the tools used once a tool is fixed in position.

The device according to the invention is of the type comprising a sleeve provided with a mobile locking element intended to be traversed by a sectioned pin secured with each tool and which is adapted to the resiliently urged inside an annular depression made in the pin. It is essentially noteworthy in that the locking element is mounted inside a bore suitably connected to a pressurized fluid installation adapted to ensure displacement thereof along its axis. The locking element is oriented obliquely with respect to the axis common to the sleeve and to the pin and includes an inner tooth or bearing which engages against one of the edges of the annular depression of the pin to urge the two above-mentioned members together by force once the pin is engaged in the locking element.

BRIEF DESCRIPTION OF THE DRAWINGS

The invention will be more readily understood on reading the following description with reference to the accompanying drawings, in which:

FIG. 3 is a view in perspective of the locking element in the dismantled state.

DESCRIPTION OF THE PREFERRED EMBODIMENT

Figure 1:
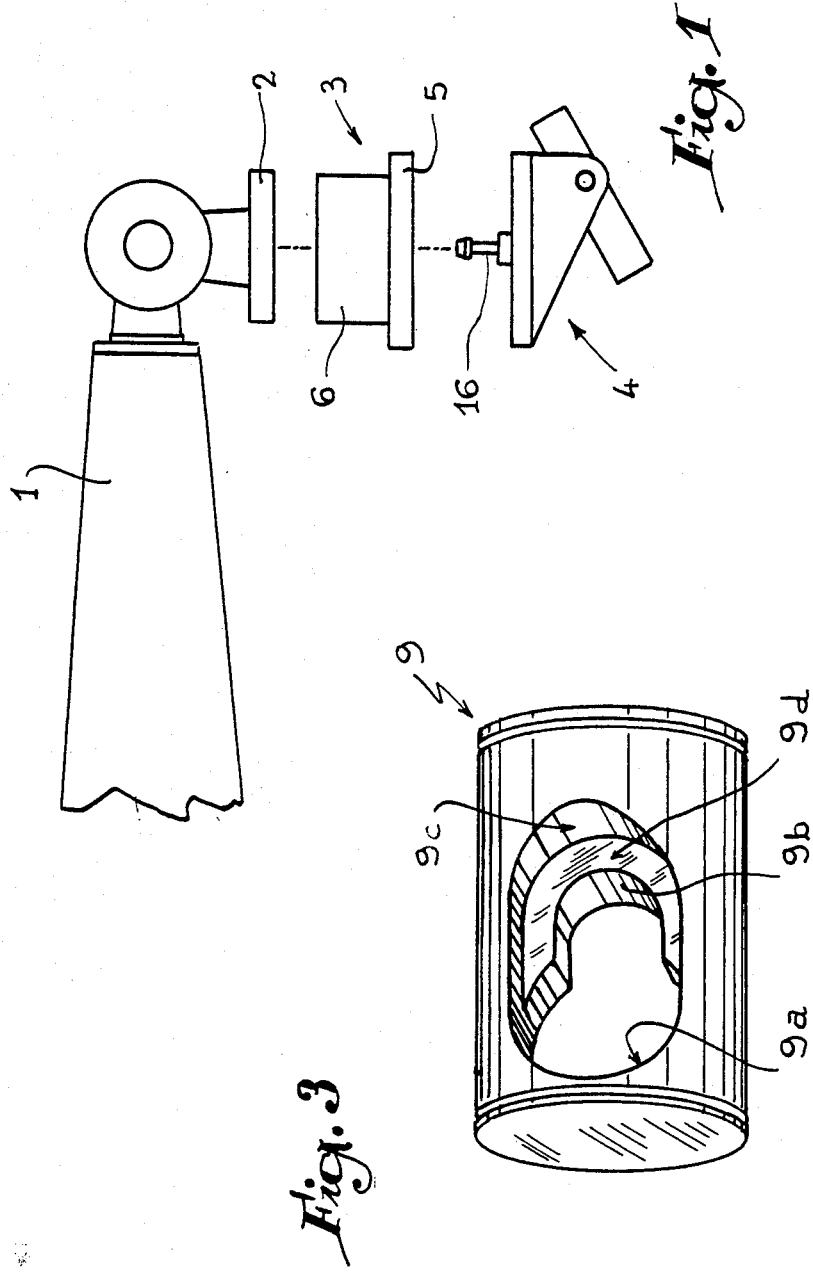
FIG. 1 is a schematic side view illustrating the assembly of a gripping device at the end of the mobile arm of a remote manipulator.

Referring now to the drawings, FIG. 1 shows at 1 the free end of the mobile arm of a remote manipulator, which pivotally bears a plate 2 against which is fixed the gripping device 3. The gripping device is adapted to ensure automatic fixation of any one of a series of work tools 4.

Figure 2:
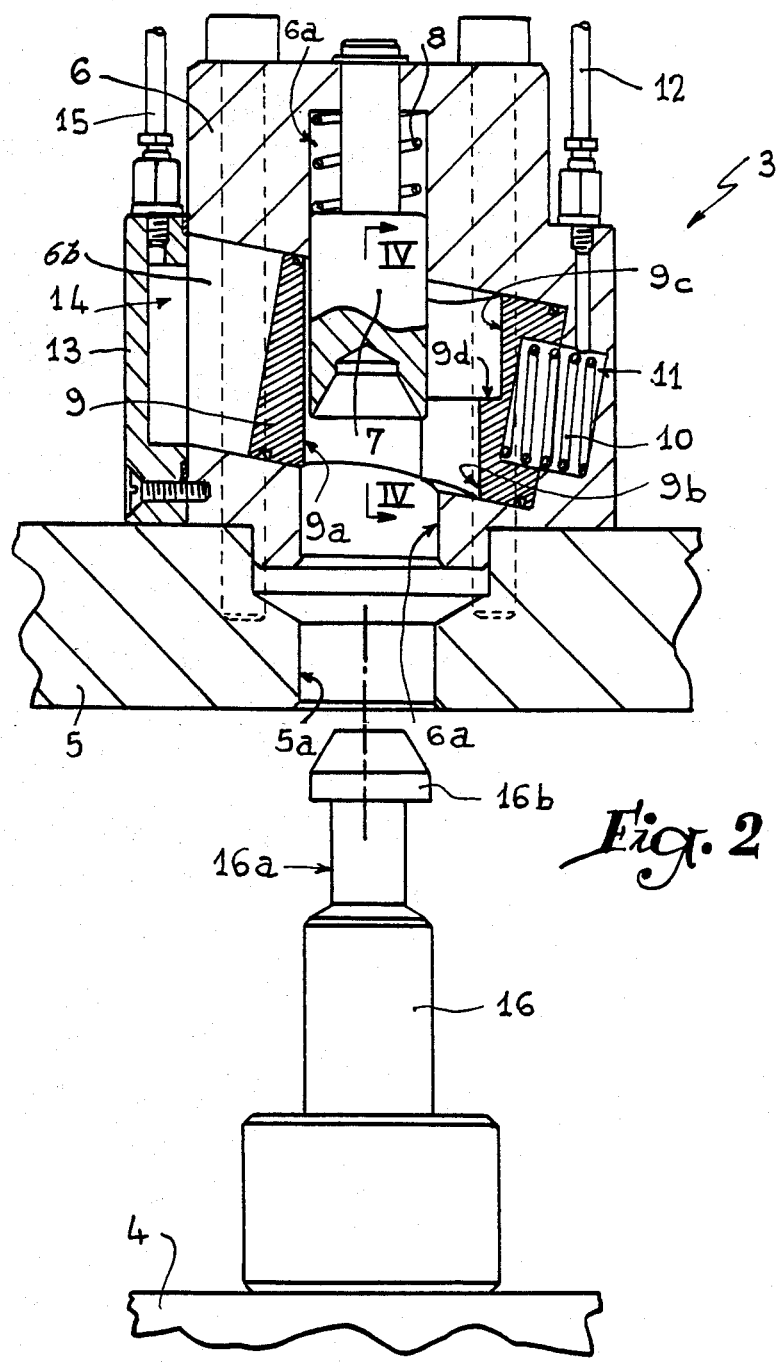
FIG. 2 is an axial section on a larger scale, showing the gripping device according to the invention and one of the corresponding tools, prior to engagement with the gripping device.

As shown in FIG. 2, the body of the device 3 is formed by assembling a plate 5 and a sleeve 6 in the axial bore 6a of which is engaged a cylindrical pusher or piston 7 associated with a return spring 8 which tends to urge it downwardly. In the sleeve 6 is made a bore 6b which intersects the bore 6a, by being oriented slightly obliquely with respect to the axis of the sleeve. This oblique bore 6b forms a housing for the hermetic slide of a cylindrical locking element 9 which is provided with an opening of which the complex profile may be seen in FIG. 3.

As shown, this opening presents a principal part 9a of large radius which extends over the whole thickness of the piece and which is joined laterally, on the one hand downwardly, to a part 9b of small radis, on the other hand upwardly to a part 9c of which the radiuus is equal to that of the principal part 9a. It will be readily understood that between the two superposed lateral parts 9b and 9c is defined a shoulder 9d in the form of a tooth, oriented perpendicularly to the axis of the bore 6a of the sleeve 6.

Figure 4:
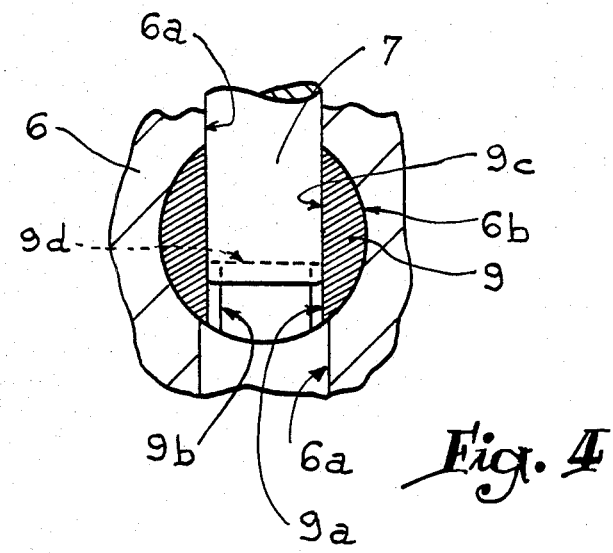
FIG. 4 is a longitudinal section in detail, along lines IV—IV of FIG. 2.
Figure 7:
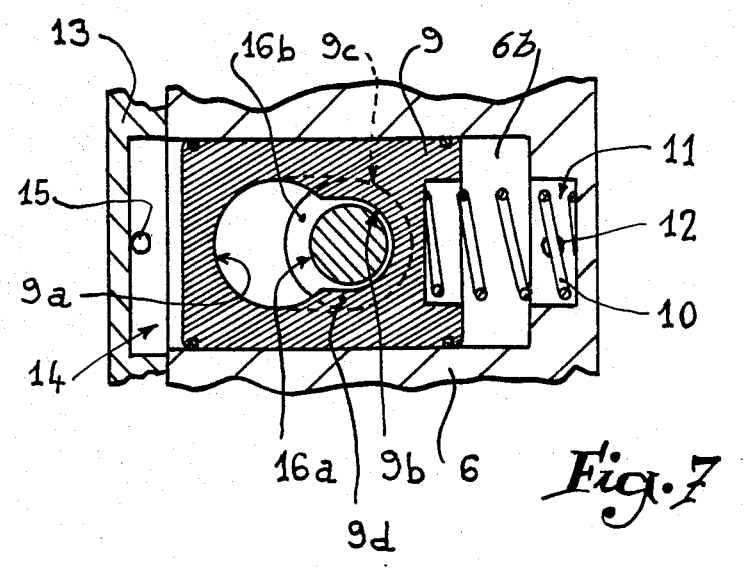
FIG. 7 is a section along lines VII—VII of FIG. 6.

It will be observed in FIG. 4 that the partial engagement of the pusher or piston 7 inside the opening 9a opposes any untimely angular displacement of the locking element once the latter has been placed in position in the bore 6b through the end thereof, provided to be open. It will also be noted (FIG. 2) that this pusher 7 is engaged with reduced clearance in the principal part 9a over a height or to an extent such that it forms a stop for the lateral part 9b of small radius.

With the locking element 9 is associated a return spring 10 (FIG. 2) which, abutting against the closed end of the oblique bore 6b, tends to push said locking element towards the opposite open end. This spring 10 is housed inside a chamber 11 connected by a pipe 12 to the distributor of a pneumatic or hydraulic installation. On the contrary, a lateral cap 13 is provided against the sleeve 6 and defines with the opening of the oblique bore 6b a chamber 14 associated with a pipe 15 connected to the distributor.

It should also be observed that each of the tools 4 comprises a projecting pin 16, having an annular recess 16a hollowed therein, of which the diameter is very slightly smaller than that of part 9b of the opening of the locking element 9.

Figure 5:
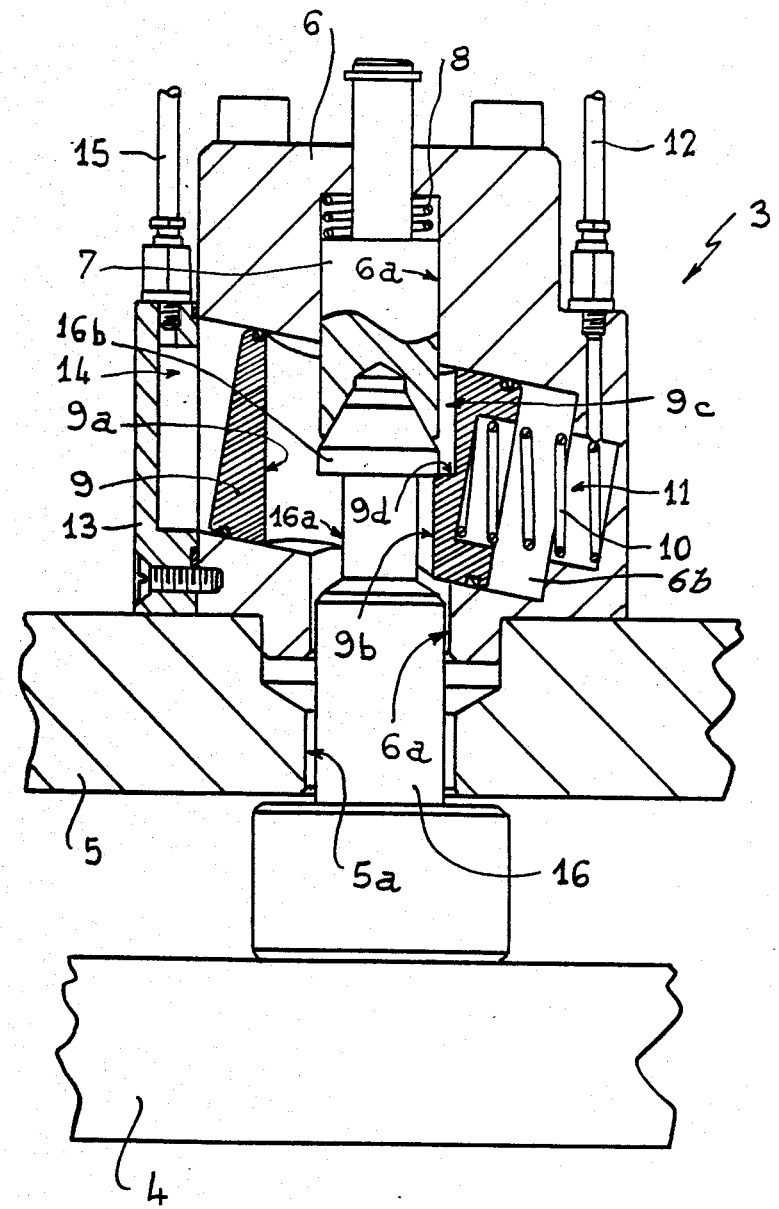
FIG. 5 reproduces FIG. 2, after the knob of the tool has been engaged inside the device.

Operation and use of the gripping device described hereinabove will be apparent from a comparative study of FIGS. 2, 5 and 6.

If it is assumed that, from the disconnected position shown in FIG. 2, the body 5-6 of the device lowers in the direction of the tool 4 in question, it will be understood that the sectioned endpiece 16b of pin 16 passes firstly through the opening 5a made in the plate 5 in register with the bore 6a of the sleeve, and consequently engages, firstly in the lower opening of such bore, then in the principal part 9a of the opening of the locking element 9. This penetration obviously provokes elastic recoil of the pusher or piston of which the free end will at a given moment lie at the level of the lateral part 9c of large radius. At that instant and as illustrated in FIG. 5, the spring 10 pushes the locking element 9 of which the lateral part 9c embraces the piston 7 while the transverse tooth 9b partially slides into the recess 16a in the pin 16.

Figure 6:
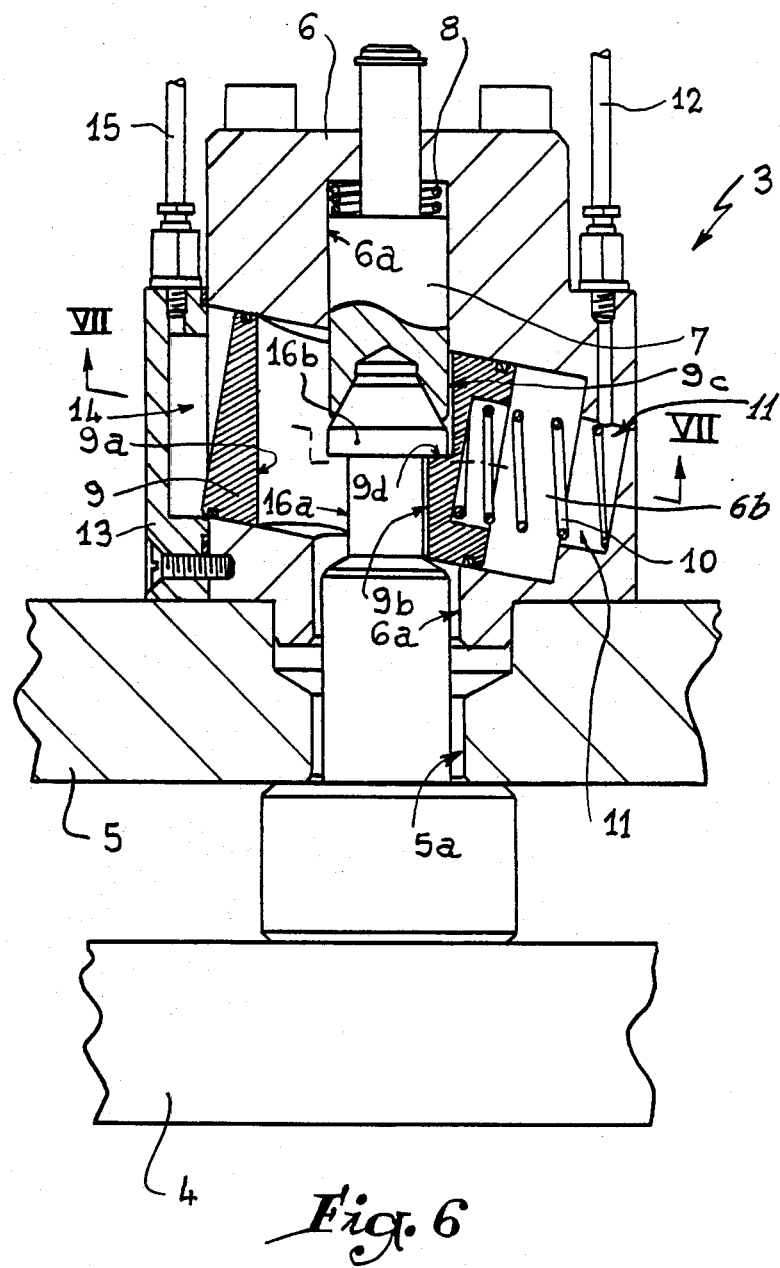
FIG. 6 is a similar section, but the pieces being shown after the tool has been fitted by force.

If it is assumed that at that moment the pipe 12 is supplied through the distributor of the installation, the pressurized fluid which fills the chamber 11 axially pushes the locking element 9 until the latter is brought to the position illustrated in FIG. 6. It will be readily appreciated that, owing to the obliqueness of the displacement of the locking element 9 with respect to the axis of pieces 6 and 16, the tooth 9b exerts to the pin 16 an effort of which the resultant provokes axial displacement of the pin and, consequently, brings the two pieces 4 and 3 together by force.

This effort of approach is maintained as long as the chamber 11 is supplied, thus opposing any appearance of separation between the tool and the gripping device. It stops only when, for the purpose of disconnecting this tool 4, the pipe 15 is supplied with pressurized fluid to return the locking element 9 into the initial position according to FIG. 2. It will be observed that, at that moment, the pin 16 is expelled from the body 5–6 by the spring 8 associated with the piston 7, so that the tool 4 is automatically released.

The objects principally desired are thus obtained, namely an entirely automatic operation despite a simple and robust construction, and an automatic compensation of the clearance likely to appear between the tool and the gripping device.

It will be noted that the spring 10 may advantageously be provided to be of such force as to hold the pieces 3 and 4 in the close position by itself, in the event of the pressurized fluid installation failing.

It must, moreover, be understood that the foregoing description has been given only by way of example and tha it in no way limits the domain of the invention which would not be exceeded by replacing the details of execution described by any other equivalents.

What is claimed is:

1. A tool gripping apparatus for remote manipulators, industrial robots and similar assemblies wherein the tool includes a pin member having an annular depression therein and an elongated axis, the gripping device comprising a sleeve having a first bore aligned with the elongated axis of the pin member and a second bore communicating with said first bore and extending obliquely with respect thereto, a pusher element slideable within said first bore, a locking member slideable within said second bore, said locking member having an opening therethrough in which said pin member is selectively received and a bearing surface adjacent said opening for selectively engaging in the depression in the pin member, a source of fluid pressure communicating with said second bore and operable to urge said locking member along said second bore in a direction which brings the tool into a forced engagement with said sleeve with said bearing surface engaging in the depression in the pin member, and resilient means for continuously urging said pusher element toward said locking member so that said pusher element extends within said opening in said locking member to align said opening with said first bore with the pin member of the tool is not extended therethrough.

2. The tool gripping apparatus of claim 1 in which said opening in said locking member includes a primary portion which extends throgh said locking member and which is of a first radius which is of a size to receive said pusher element and the pin member, a first laterally offset portion of a smaller radius so as to cooperatively permit the depression of the pin member to be positioned therein, and a second laterally offset portion superposed over said first laterally offset portion and having a radius substantially equal to said first radius so that said pusher element may be positioned therein when said pin member is positioned within said primary portion of said opening, and said bearing surface being defined between said first and second laterally offset portions.

* * * * *